US005568541A

United States Patent [19]
Greene

[11] Patent Number: 5,568,541
[45] Date of Patent: Oct. 22, 1996

[54] SYSTEM AND METHOD FOR ADDING A SURCHARGE TO THE COST/CALL FOR TELEPHONE SOLICITATIONS

[76] Inventor: Leonard M. Greene, 6 Hickory La., Scarsdale, N.Y. 10583

[21] Appl. No.: 262,972

[22] Filed: Jun. 21, 1994

[51] Int. Cl.$^6$ .................. H04M 15/00; H04M 15/06; H04M 3/42
[52] U.S. Cl. .................. 379/114; 379/111; 379/112; 379/113; 379/115; 379/121; 379/122; 379/132; 379/133; 379/134; 379/140; 379/201; 379/142
[58] Field of Search .................. 379/111–115, 91, 379/121, 122, 132–136, 140, 201, 142

[56] References Cited

U.S. PATENT DOCUMENTS

| | | | |
|---|---|---|---|
| 4,054,756 | 10/1977 | Comella et al. | 179/18 B |
| 4,266,098 | 5/1981 | Novak | 179/5.5 |
| 4,544,804 | 10/1985 | Herr et al. | 179/13 C |
| 4,754,478 | 6/1988 | Leibersberger et al. | 379/204 |
| 4,763,191 | 8/1988 | Gordon et al. | 379/91 |
| 4,807,023 | 2/1989 | Bestler et al. | 379/105 |
| 4,908,850 | 3/1990 | Masson et al. | 379/91 |
| 4,989,233 | 1/1991 | Schakowsky | 379/113 |
| 5,003,584 | 3/1991 | Benyacar et al. | 379/121 |
| 5,146,491 | 9/1992 | Silver et al. | 379/114 |
| 5,148,474 | 9/1992 | Haralambopoulos et al. | 379/111 |
| 5,155,761 | 10/1992 | Hammond | 379/142 |
| 5,179,584 | 1/1993 | Tsumura | 379/121 |
| 5,187,710 | 2/1993 | Chau et al. | 379/115 |
| 5,222,125 | 6/1993 | Creswell et al. | 379/112 |
| 5,272,749 | 12/1993 | Masek | 379/201 |
| 5,291,550 | 3/1994 | Levy | 379/113 |
| 5,299,258 | 3/1994 | Tsumura | 379/112 |
| 5,333,186 | 6/1994 | Gupta | 379/114 |
| 5,341,414 | 8/1994 | Popke | 379/142 |
| 5,343,517 | 8/1994 | Bogart et al. | 379/112 |
| 5,381,467 | 1/1995 | Rosinski | 379/113 |
| 5,448,633 | 9/1995 | Jamaleddin et al. | 379/112 |

Primary Examiner—Wellington Chin
Assistant Examiner—Vijay Shankar
Attorney, Agent, or Firm—David E. Dougherty

[57] ABSTRACT

A method for placing a surcharge on telephone solicitations including the steps of providing a local telephone number to a customer for accessing a call from an originating caller and identifying the originating caller's telephone number, as for example, by conventional caller identification systems. The method also includes the steps of advising the caller of the surcharge and providing an opportunity to complete the call by accepting the surcharge or terminating the call without charge. For example, the subscriber's equipment may incorporate an automatic answering system including voice responsive functions and call forwarding. The method also includes the steps of billing the caller for the surcharge and crediting a portion of that charge to the customer's account.

7 Claims, 3 Drawing Sheets

SYSTEM AND METHOD FOR ADDING A SURCHARGE TO THE COST/CALL FOR TELEPHONE SOLICITATIONS

FIELD OF THE INVENTION

This invention relates to a telecommunications method and system, and more particularly, to a method and system for adding a surcharge to the cost per call for telephone solicitations and for crediting a portion of the surcharge to the account of the person called.

BACKGROUND OF THE INVENTION

Methods and apparatus for specifying and calculating the billing charges associated with value-added phone calls from a credit or debit account telephone consumer are well known. Such methods and apparatus, referred to as value-added services or 700 or 900 number services, allow service providers to determine a fee to be charged for a service and to establish that fee in real time during a telephone conversation with the person requesting such services. For example, U.S. Pat. No. 5,148,474 of Haralambopoulas et al. discloses a business method and apparatus wherein a party calls a 700 or 900 number for a service, is identified via one or two separate code sequences, and requests a service from the called provider who establishes a rate for compliance. The caller authorizes and initiates the established charge to an account associated with one of the code sequences which preferably is a telephone number associated with a credit or debit account by completing a third-party call to a designated value-added number. Confirmation of the authorization and acceptance of the charge is monitored by the provider who proceeds to provide the service requested at the established rate which may be changed at any time during the telephone call by the provider followed by appropriate caller authorization.

In recent years, more and more businesses have turned to telephone marketing in an effort to increase their sales and at the same time to control the costs which are associated with making a sale. As a result, residential telephone subscribers are being inundated with such calls, particularly during evening hours, when the residents are most likely to be at home. Many subscribers, in an attempt to thwart such calls, are relying on voice mail, caller identification and telephone answering machines to avoid unwanted solicitations. Others who insist on answering the phone may listen to all or part of the spiel and then hang up on the caller. The telephone marketer would, of course, like to reduce the number of calls to disinterested parties and concentrate on those individuals who might be interested in the product or services being offered. At the same time, the individual subscribers would like to eliminate calls which are offering products or services for which they have no interest. Accordingly, it is presently believed that there is a relatively large market for a method and system for screening out or qualifying "junk calls" i.e., telephone solicitations.

It is also presently believed that a method and system in accordance with the present invention will lead to a higher percentage of receptive calls verses calls to parties with no interest in the services being offered. In addition, it is believed that such a method and system will increase the number of parties who are willing to listen to the telephone solicitation and at the same time minimize interruptions to telephone subscribers who do not want to receive such calls.

BRIEF DESCRIPTION OF THE INVENTION

In essence, the present invention contemplates a method for placing a surcharge on telephone solicitations which includes the steps of providing a local telephone number to a customer to access a call from an originating caller's telephone number and identifying the originating caller's telephone number. The method also includes the steps of selecting those numbers which are to be charged for a continuation of the call and advising the selected caller that a surcharge will be incurred for completing the call. In addition to the aforementioned steps, the method gives the selected caller an opportunity to terminate the call or accept the surcharge. The method then bills the selected caller who fails to terminate the call for the surcharge and credits the receiving number with a portion of the surcharge. The invention also contemplates a system and apparatus for carrying out the aforementioned method. In a preferred embodiment of the invention, the method and system allows the subscriber to program the system to include a plurality of telephone numbers which will automatically bypass the billing portion of the system.

The invention will now be described in connection with the accompanying drawings wherein like reference numerals have been used to identify like steps.

DETAILED DESCRIPTION OF THE PREFERRED EMBODIMENTS OF THE INVENTION

The following is a detailed description of the best modes presently contemplated for practicing the invention. The descriptions are intended as illustrations and should not be construed in a limiting sense.

The method and system in accordance with the present invention provides local subscribers with an ability to automatically or manually add a surcharge to calls from telephone solicitors as a prerequisite to the completion of or continuation of a telephone conversation with the local subscriber. The surcharge may, for example, be achieved by employing a plurality of individual value-added numbers and requiring the caller to dial the appropriate number or numbers via a conference call switching connection.

In one embodiment of the invention, the billing system is incorporated in a carrier switch network. The carrier switch network permits the called party to connect the incoming call to the network's conference support system in real time to assess a surcharge. The subscriber's specified call billing parameters are then incorporated into a standard Automatic Message Accounting record which is generated by the carrier switch network for each call and sent to the billing system which processes the charges for inclusion in the network bill sent to the caller and credits a portion of those charges to the account of the person called.

The billing method and apparatus used in the practice of the present invention is accomplished in a conventional manner which will be well understood by persons of ordinary skill in the art. For example, a telephone communications billing method is disclosed in the United States Patent of Chau et al., U.S. Pat. No. 5,187,710, which is incorporated herein in its entirety by reference. Another method for billing, which has been used in connection with value-added calls, i.e., 700 or 900 number services, is disclosed in the United States Patent of Haralambopoulos et al., U.S. Pat. No. 5,148,474, which is also incorporated herein in its entirety by reference. Each of the methods and apparatus disclosed in the aforementioned patents can be readily modified by a person of ordinary skill in the art for use with local exchanges as distinguished from the value-added services.

Figure 1:
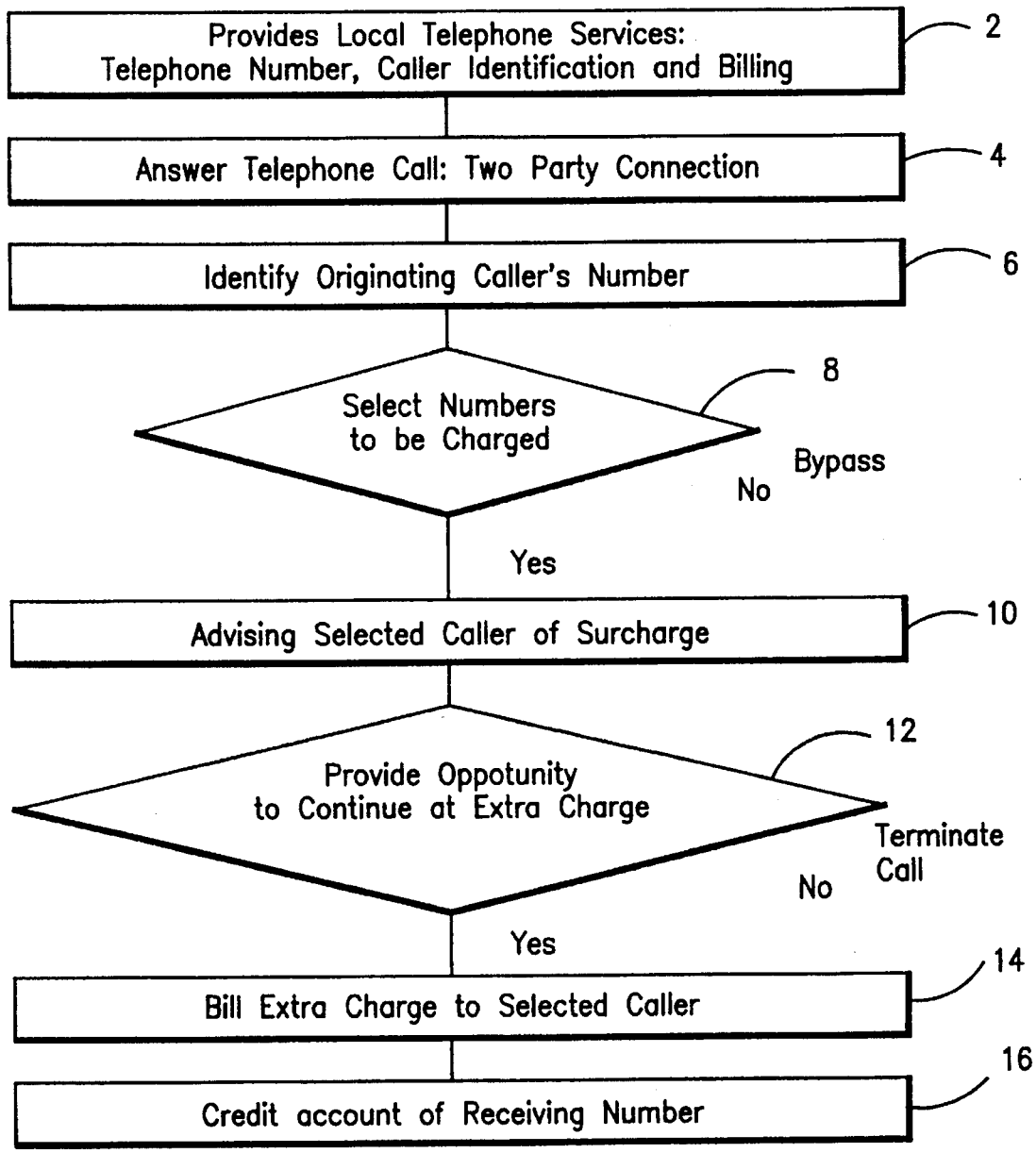
FIG. 1 is a block diagram illustrating a method for placing a surcharge on telephone solicitations in accordance with a first embodiment of the invention.

Referring now to FIG. 1, a customer for telephone services may subscribe to an enhanced telephone system from a local carrier network which provides the system to the customer as illustrated in box 2 of FIG. 1. The system includes caller identification and billing services so that a surcharge can be added to those calls which are identified as telephone solicitations. When a caller places a call to the customer's phone, the call is answered as illustrated in box 4, and a two party connection is established.

Figure 2:
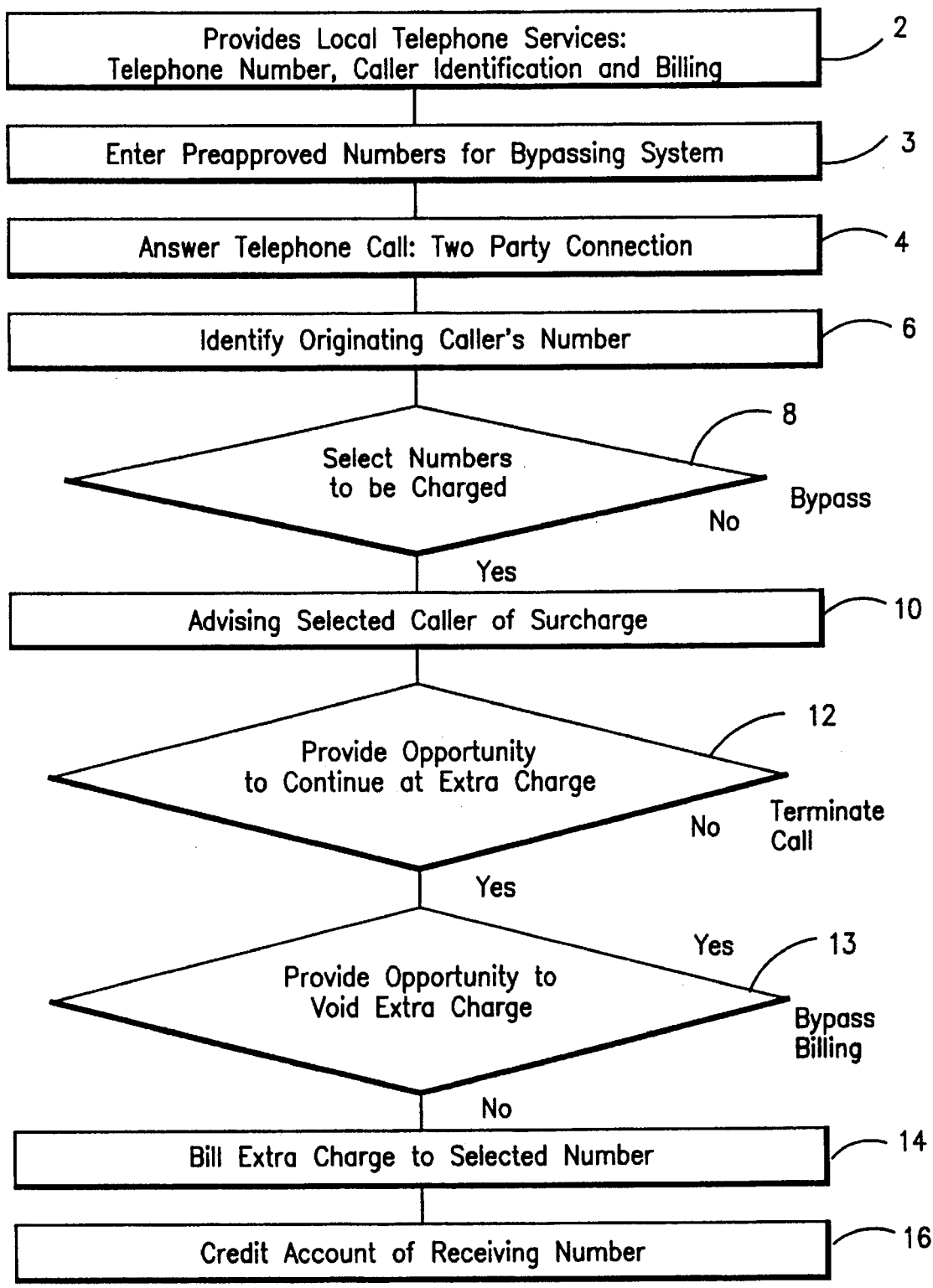
FIG. 2 is a block diagram illustrating a method for placing a surcharge on telephone solicitations in accordance with a preferred embodiment of the invention; and, FIG. 3 is a block diagram illustrating a method for placing a surcharge on telephone solicitations in accordance with a third embodiment of the invention.

In a preferred embodiment of the invention, as illustrated in FIG. 2, the subscriber enters or programs preselected telephone numbers and/or a local exchange into their telephone system in step 3. The subscriber enters the preselected numbers into the system so that any calls which are initiated from those numbers or exchanges will bypass that portion of the system which advises a telephone solicitor of a surcharge and adds the surcharge to the caller's bill. By using this feature, calls from family, friends, business associates, doctors and neighbors are automatically treated as conventional calls and connected to the subscriber's phone in a conventional manner.

In practice, an individual calls the subscriber and the call is automatically answered as shown at 4. When answered, (see FIG. 1) the telephone number of the calling party is identified electronically in step 6 and compared to the subscriber's data base in a data processing system as indicated by box 8. If the call is made from a preselected number, i.e., a number which has been approved for direct access to the subscriber in step 3 (FIG. 2), the call is completed in a conventional manner. However, if the number of the calling party is not on the list of pre-approved numbers, the call is identified as a telephone solicitation in step 8, and the automated answering system advises the person making the call that a surcharge may or will (at the subscriber's option) be added to their bill as indicated at box 10. The caller then has an opportunity at step 12 to continue the call and accept the surcharge. For example, if the caller is willing to accept the surcharge, he may be required to press an appropriate key on his telephone. Failure to press the appropriate key on his telephone terminates the call.

Once the calling party has signified a willingness to pay the fee as, for example, by pressing an appropriate key, the call to the local subscriber is completed and the caller's account is billed in step 14. A portion of that fee is then automatically credited to the account of the local subscriber as indicated at 16.

In the preferred embodiment of the invention, illustrated in FIG. 2, the subscriber has an option in step 13 to void or waive the surcharge as for example, by pressing one or more keys on his telephone key pad. If, for example, the subscriber is sympathetic to a particular charity or solicitation, he or she may void the surcharge at any time during the conversation by causing the call to bypass the billing and crediting functions as shown in steps 14 and 16.

Figure 3:
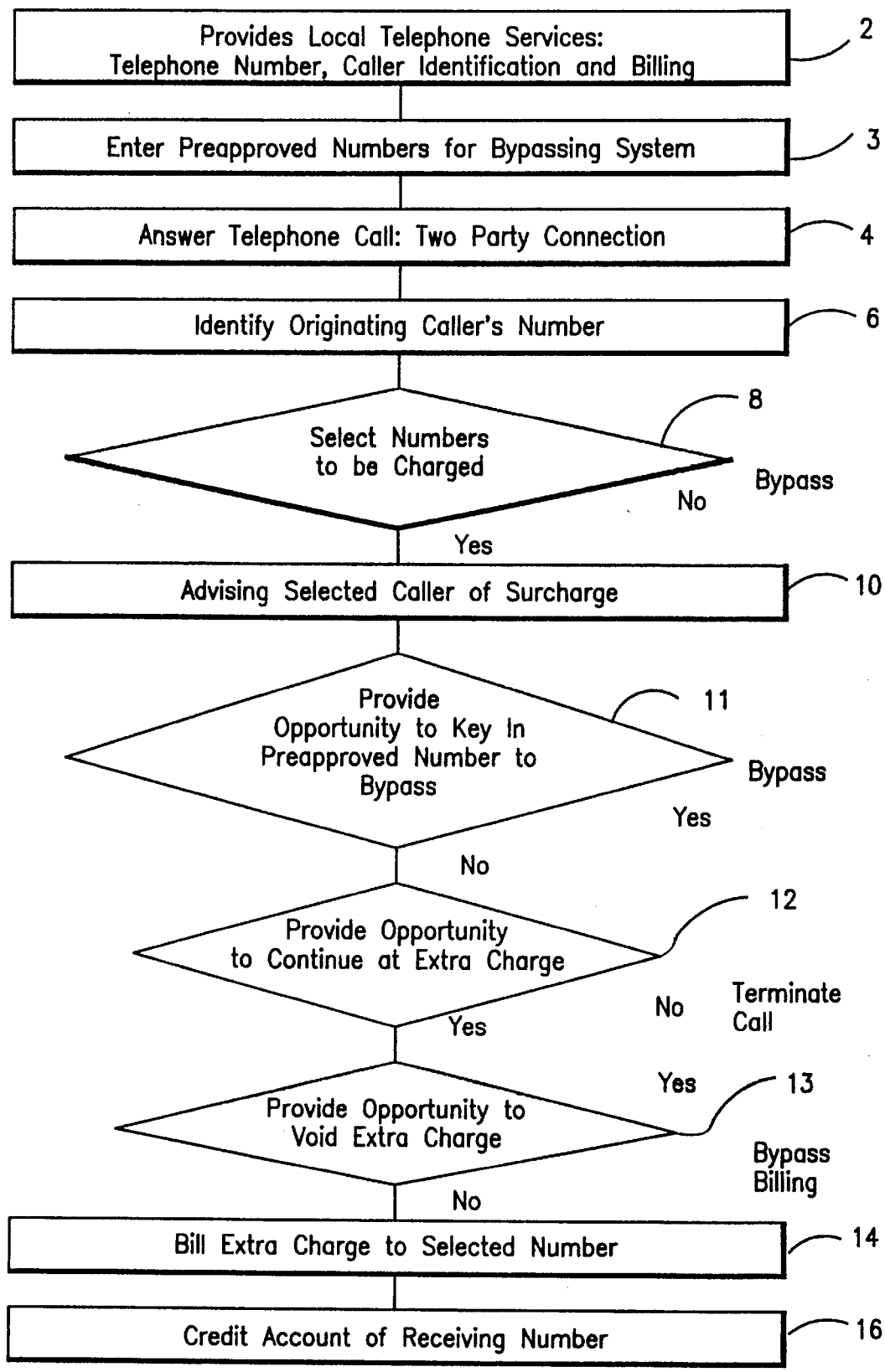

The third embodiment of the invention which is illustrated in FIG. 3 operates in the same manner as the preferred embodiment shown in FIG. 2. However, the third embodiment of the invention includes a step which enables the party making the call to key in a pre-approved number to bypass the billing functions as illustrated by box 11. For example, if a friend or neighbor calls from a telephone having a number which is not listed in the subscriber's system (step 3) and receives notification of a surcharge, the calling party has an opportunity to dial in their own pre-approved number and bypass the billing steps.

The method and system in accordance with the present invention may be implemented through a method of operation which combines the various services provided by telephone service providers in a new and unique way. The methods and systems may be built around the conference call utility such as presented in U.S. Pat. Nos. 4,754,478 or 4,544,804; automated billing systems such as U.S. Pat. No. 4,908,850, and the value-added area code exchange concept whereby callers are billed directly by the telephone company at established rates as described more fully in U.S. Pat. No. 5,003,584. According to the method presented by this specification, a telephone solicitor calls a local subscriber to establish a connection between the first two parties of a conference call. During the course of the conversation, if it is determined that the caller is to be charged, the local subscriber advises the caller to dial a value-added exchange number. When the calling party dials the value-added exchange number, they are provided with a brief warning message which repeats the rate that they are being charged. The local subscriber hears this message and may use it as confirmation that the calling party has dialed the requested number to establish a three-way conference call. The third line on this conference call is the value-added number, and after its brief recorded message, it remains silent. The function of the third line is to provide automatic billing for the time during which the connection is maintained.

In the execution of the aforementioned embodiments, the subscriber's equipment establishes a conference network switched path over which a root value-added number is dialed. The caller is then instructed to dial the number or numbers required to complete the call. The carrier switched network identifies the calling party to be billed at the completion of the dialing operation and because the requesting party completed the dialing operations, he or she is billed according to the value-added rate in the carrier switched network's look-up table. The subscriber's equipment may be an automatic answering system including voice responsive functions and call forwarding or a completely manually operated system with a standard telephone or any combination of automatic and semi-automatic apparatus.

Many of the method steps and system functions described herein may be accomplished by computer software and/or firmware which are well within the competence of a person of ordinary skill in the telecommunications and programming arts.

While the invention has been described in connection with its preferred embodiments, it should be recognized and understood that changes and modifications can be made without departing from the scope of the appended claims.

What is claimed is:

1. A method for adding a surcharge to the cost per call for telephone solicitations comprising the steps of:

(a) providing a local telephone number to a customer to access a call from an originating caller's telephone number;

(b) identifying an incoming call as a telephone solicitation;

(c) identifying the originating caller's telephone number;

(d) selecting those numbers which correspond to a telephone solicitation and which are to be charged for a continuation of the call;

(e) advising the selected caller that a surcharge will be incurred for completing the call;

(f) giving the selected caller an opportunity to terminate the call or accept the surcharge;

(g) billing the selected caller who fails to terminate the call for the surcharge; and, (h) crediting the called party with a portion of the surcharge.

2. A method for adding a surcharge to the cost per call for telephone solicitations in accordance with claim 1 which includes the step of identifying one or more preselected telephone numbers which will automatically bypass steps e through h and complete the call as a conventional two party connection.

3. A method for adding a surcharge to the cost per call for telephone solicitations in accordance with claim 2 which includes the step of providing an opportunity to the originating caller to enter one of the preselected telephone numbers after step e in order to bypass steps g and h.

4. A method for adding a surcharge to the cost per call for telephone solicitations in accordance with claim 1 which includes the step of giving the customer who receives a call an opportunity to cancel the surcharge at any time during the call.

5. A method for adding a surcharge to the cost per call for telephone solicitations in accordance with claim 2 which includes the step of giving the customer who receives a call an opportunity to cancel the surcharge at any time during the connection.

6. A method for adding a surcharge to the cost per call for telephone solicitations in accordance with claim 5 wherein the advising and billing steps are based on a single flat charge for the completion of the call.

7. A method for adding a surcharge to the cost per call for telephone solicitations in accordance with claim 5 wherein the advising and billing steps are based on a rate for each fixed period of time.

* * * * *